United States Patent
Oigarden et al.

[11] 3,891,985
[45] June 24, 1975

[54] DRONE CONTROL SYSTEM WITH PULSE POSITION ENCODING

[75] Inventors: Tarald H. Oigarden, Cold Spring Harbor; Erwin S. Teltscher, Forest Hills; Robert D. Gross, New York, all of N.Y.

[73] Assignee: Sperry Rand Corporation, New York, N.Y.

[22] Filed: Feb. 21, 1961

[21] Appl. No.: 90,886

[52] U.S. Cl. .................. 340/353; 328/61; 325/143; 343/6.5 R
[51] Int. Cl. ...................... G08c 19/22; G08c 19/28
[58] Field of Search .......... 340/203, 206, 350, 353; 343/6.5, 6.5 R; 332/9; 331/50, 55, 56; 325/143; 328/61

[56] References Cited
UNITED STATES PATENTS

| | | | |
|---|---|---|---|
| 2,848,616 | 8/1958 | Tollefson | 331/55 |
| 2,911,642 | 11/1959 | Hickley et al. | 343/6.5 |
| 3,041,538 | 6/1962 | Bodez | 325/143 |
| 3,053,478 | 9/1962 | Davenport et al. | 340/206 |
| 3,151,323 | 9/1964 | Baldridge | 343/6.5 R |
| 3,162,857 | 12/1964 | Sanders | 340/206 |

FOREIGN PATENTS OR APPLICATIONS
569,650  1/1959  Canada ........................ 343/6.5

*Primary Examiner*—Richard A. Farley
*Assistant Examiner*—H. A. Birmiel
*Attorney, Agent, or Firm*—Samuel C. Yeaton

EXEMPLARY CLAIM

1. A pulse encoder comprising a set of series connected pulse producers, a multiple frequency source, said source being connected to the input of one of said producers the latter being controlled thereof, delay networks disposed in the series connections of said producers, a second set of pulse producers connected in parallel lines and driven by the output of the first mentioned set of producers, means for pulse position modulating the pulse generated by said second set of pulse producers, said means being controlled by said source and another of said producers, a common output line, each of said pulse producers in the two sets of producers being individually connected to said common output line, and a pulser connected to said output line.

6 Claims, 4 Drawing Figures

DRONE CONTROL SYSTEM WITH PULSE POSITION ENCODING

This invention relates to telemetry systems employed to track and control the flight of unmanned air vehicles and particularly to the encoding units required to form the information which is transmitted for that purpose.

Hitherto drone tracking and control systems have utilized two independent links, one to provide a command information channel and the other to perform the tracking function. The present system employs a single link for both tracking and control purposes. The consequent reduction in the number of components as well as circuit complexity may be appreciated. The tracking and control transmitting system and particularly its encoding component which is arranged according to the inventive concept is comparatively economical to construct and efficient in operation and design.

In general, the tracking and guidance system which is contemplated by the invention functions as a remote control for drone aerial platforms and the sensors mounted in them. The subject of this invention pertains to the ground equipment phase of the entire tactical system which is located at the ground station and in the drone. This equipment which comprehensively includes tracking, telemetry, computing, plotting and flight control encoding units function to interrogate the beacon in the drone which returns in response thereto the tracking information employed to control its flight. This interrogation is accomplished with the use of radar pulses which are either accepted or rejected by the drone beacon according to the setting of its unlocking mechanism. Because control of the drone aircraft is accomplished by using this same radar tracking link, there is permitted use of a single radar antenna instead of two separate antennas thereby reducing control complexity. Because a single radiation system is used, additional security of the system is gained. More specifically, the radar interrogation pulses used to unlock the radar beacon system in the drone for tracking purposes are grouped with pulses which provide the necessary control information. Many groups composed of tracking and control pulses are transmitted by the radar per second and these code groups constitute the single radar link from the ground equipment to the drone. It is in particular the encoder unit of the ground equipment which is the heart of the system and which is, therefore, described in detail below. It is the encoder for example which forms a code group of five pulses with the first three pulses supplying interrrogation coding for the radar beacon in the drone and the last two pulses in each group providing the control or guidance information therefor. The code groups are transmitted at the rate of 713 groups per second. The encoder provides delay units for correctly spacing the first three pulses of each group representing the unlocking signal for the drone beacon according to a preselected code for the drone which is to be tracked and controlled. It also provides frequency modulating units for spacing the fourth and fifth pulses relative to the third pulse of each group so as to place flight control information in the radar link to the drone. The frequency modulating units are audio oscillators and are controlled by a digital command code which constitutes the encoder's input. The ground to air radar frequency consisting of discretely spaced code pulses therefore represents information in analog form controlled by the digital input to the encoder.

One object of the invention is to provide an improved pulse encoding circuit for a drone control system.

Another object of the invention is to provide a pulse encoding circuit for a drone control system which enables the latter to employ a single radar link between ground and air.

Other objects and advantages of the invention may be appreciated on reading the following detailed description of one of its embodiments which is taken in conjunction with the accompanying drawings, in which FIG. 1 is a block diagram of the pulse encoder for the drone control system;

Figure 1:
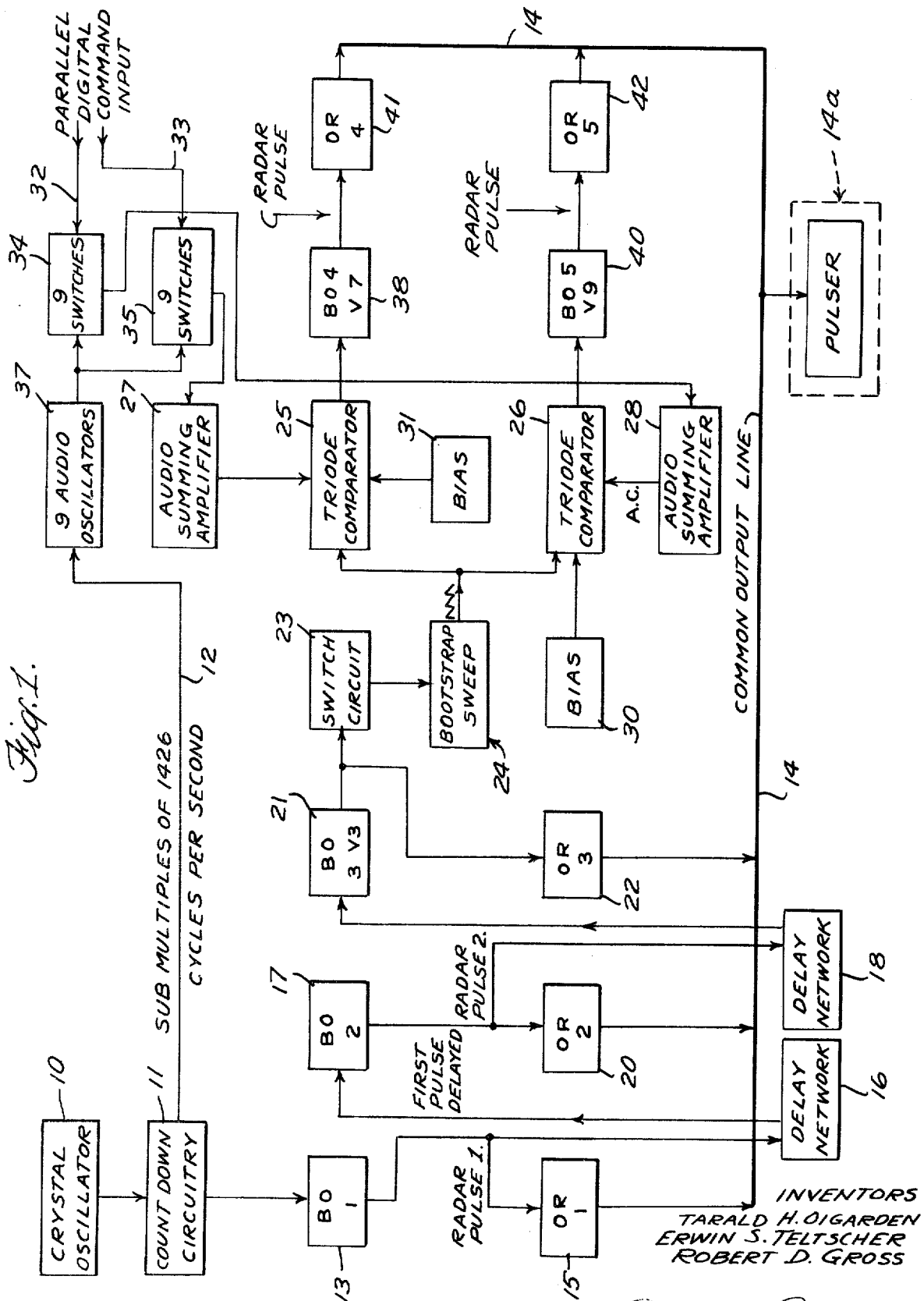

Referring to FIG. 1, a crystal oscillator 10 controls a timing or countdown circuit 11, which is adapted to generate submultiples of a frequency having 1,426 cycles per second which are placed on the output conductor 12. The first blocking oscillator of the group of blocking oscillators responsible for generating the three beacon unlocking pulses is blocking oscillator 13 which is triggered by one of the subfrequencies generated by the countdown circuit 11. The blocking oscillator 13 is triggered by the submultiple frequency of 713 cycles per second supplied by the countdown circuit. This blocking oscillator places its output on the command output line 14 through OR gate 15 and thence to pulser 14a. A delay network 16 also receives the output of the blocking oscillator 13 and its output is used to trigger the second blocking oscillator 17. The oscillator 17 introduces its output to delay network 18 and also through OR gate 20 to the command output line 14. Blocking oscillator 21, which is the third and final blocking oscillator of this group of oscillators serving to generate the coded pulses required to unlock the radar beacon in the drone for tracking purposes, is triggered by the delay network 18 and places its output on the command output line 14 through OR gate 22 and also through switch 23 to the boot strap circuit 24. A pair of triode comparators 25 and 26 are connected to receive the sawtooth output of the boot strap circuit 24 being partially controlled thereby. The triode comparators 25 and 26 also receive audio frequencies from the audio summing amplifiers 27 and 28, respectively. Bias sources 30 and 31 cause the comparators to generate their output separately in time, their output being generated when their input voltage levels are equal. Parallel input circuits 32 and 33 provide digital command pulses for switches 34 and 35, respectively. These switches are arranged in separate groups of nine and separately control the output of the nine audio oscillators in box 37 which are supplied by the submultiple frequencies on conductor 12. The groups of switches 34 and 35 selectively connect the audio oscillators in box 37 to each of the audio summing amplifiers 27 and 28, respectively. Blocking oscillator 38 and blocking oscillator 40 are connected to receive the separate outputs of the triode comparators 25 and 26, respectively, being arranged thereby to generate code pulses at separate time intervals for the second group of pulses which are the information pulses required to control or guide the drone according to tracking information received from the drone by the ground equipment in response to the beacon unlocking pulses produced by the first group of blocking oscillators 13, 17 and 21. OR gates 41 and 42 separately connect the blocking oscillators 38 and 40, respectively, to the command output line 14 providing therefor radar pulses 4 and 5 for controlling or guiding the drone.

Figure 2:
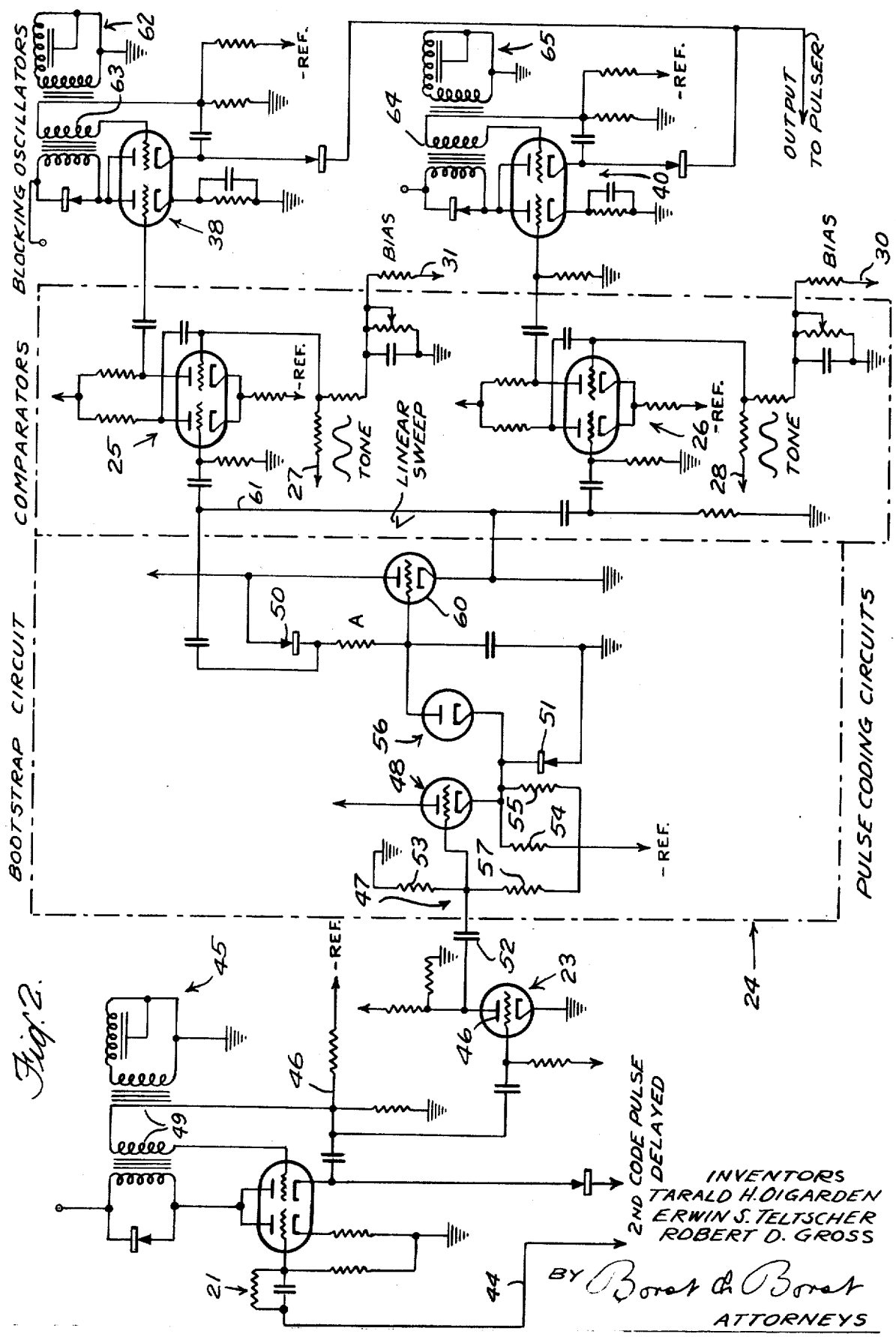
FIG. 2 is a schematic of the principal components employed in the pulse encoder.

The schematic shown in FIG. 2 illustrates the blocking oscillator 21 and its control of the boot strap circuit 24 and the comparators 25 and 26. To that end the blocking oscillator, which is a dual triode, receives the delayed code pulse from the delay network 18 on line 44. The first section of the dual triode acts as a trigger inverter. A positive pulse at its grid input lowers the command plate voltage to start the pulse formation in the second section of the dual triode. A delay network 45 is coupled through transformer 49 to the plate circuit of the blocking oscillator 21 and the output thereof is combined with the cathode output of the oscillator on line 46 which is connected to the switch circuit 23 which consists of a triode 46 followed by a capacitor-resistor network 47 of the boot strap circuit 24, a cathode follower 48 and two diode clamps 50 and 51. The triode 46 isolates the circuit so that the network is affected only by positive input pulses and is effectively disconnected from the input when negative pulses appear. A positive input pulse charges capacitor 52 of the network through resistor 53 and causes the current in the triode 48 to rise from a value close to cutoff to a much higher value. The current flowing through resistors 54 and 55 in the cathode side of the tube 48 increases the cathode potential relative to ground in a positive direction. This positive voltage back biases the half-wave rectifier diode 51 and the tube diode 56 to provide the equivalent of an open circuit from point A to ground. The opening of the series diode switch starts the sweep of the boot strap circuit 24. At the trailing edge of the pulse, the voltage on the grid of the triode 48 begins to drop as capacitor 52 discharges through the high resistance of the resistor 57. As the capacitor 52 discharges, the current through the triode 48 decreases until its cathode drops to ground potential. At this point the half-wave rectifier diode 51 clamps the cathode of the tube 48 to ground and the grid of triode 60 is brought to zero potential through the diode tube 56. This action which is the equivalent to closing a switch from point A to ground causes the sweep to stop. The capacitor 52 discharges completely in the relatively long input before the next input pulse from the blocking oscillator 21 triggers a repeat cycle. The output of the cathode follower 60 is placed by means of lead 61 on the grids located in the first section of the dual triode comparators 25 and 26. The grid electrodes in the second section of the two comparators is connected to the audio summing amplifiers 27 and 28 to receive the modulating frequency which is some multiple of the 1426 cycle per second frequency as determined by the audio oscillators in box 37 in accordance with the input command signals on input leads 32 and 33. The first section of each comparator tube is initially off in relation to the second section which is conducting. The repeatedly increasing positive sweep voltage applied to the grid in this section increases the current through the tube causing the cathode potential to rise and increase the bias on the tube. At some point of the sweep the cathode potential rises above the instantaneous value of the changing modulating voltage on the grid in the second section of the tubes and causes the comparator to fire. The bias source 30 is also connected to the grid in the second section of the dual triode comparator 26 and the bias source 31 is connected to the corresponding grid in the comparator 25.

Figure 3:
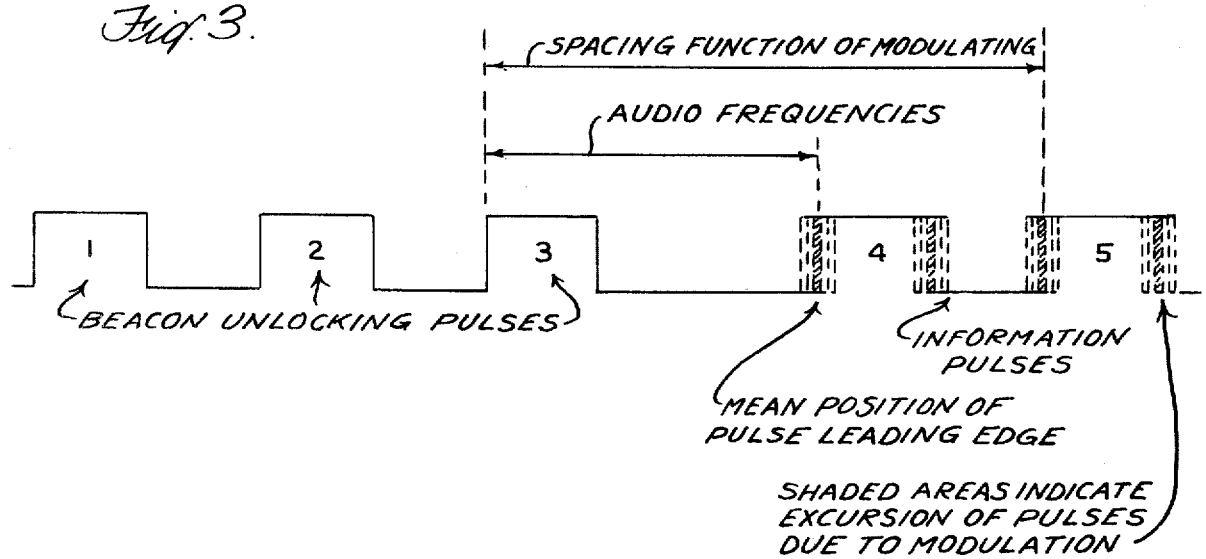
FIG. 3 is a wave diagram of a typical code group of five pulses generated by the pulse encoder.
Figure 4:
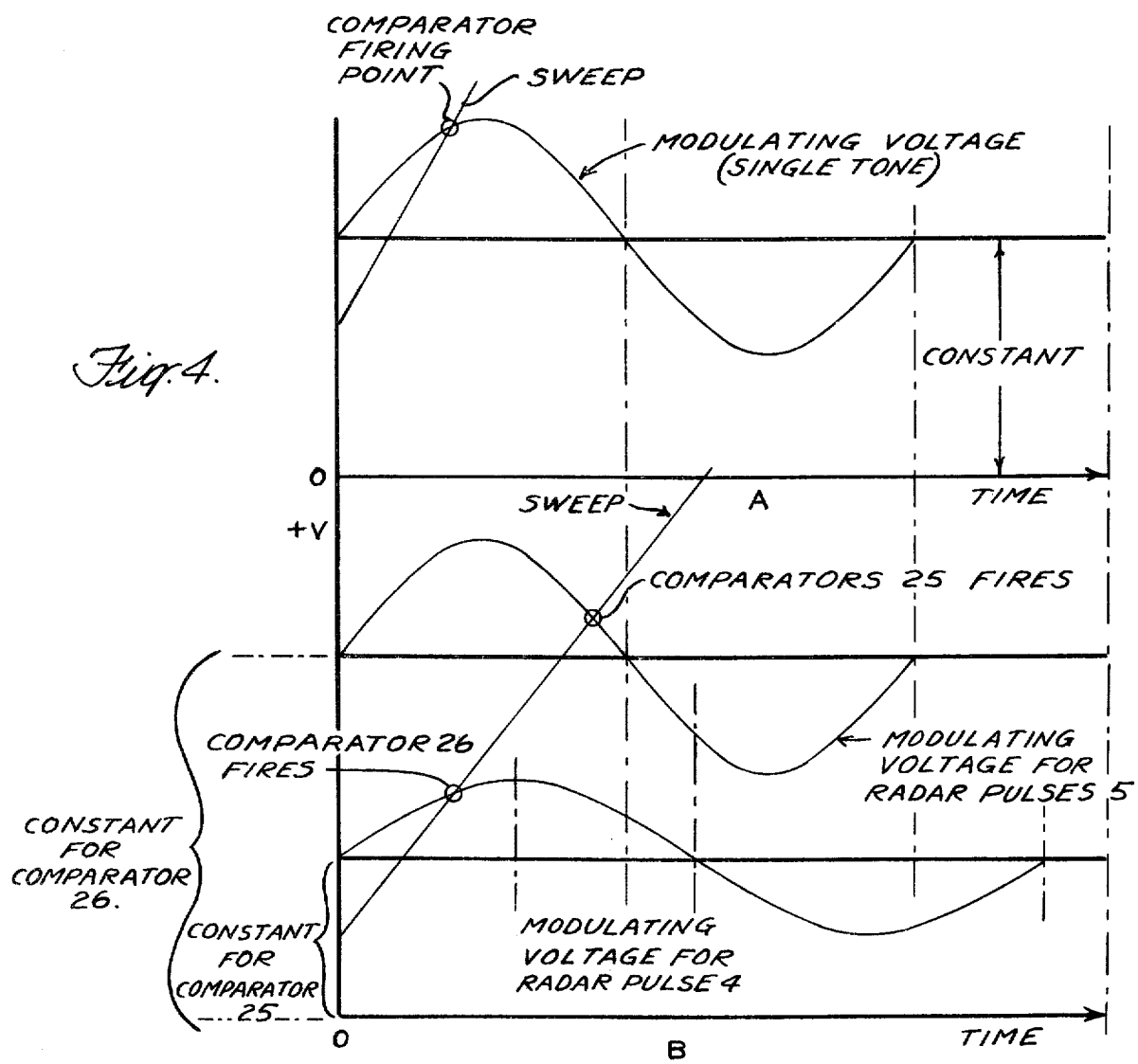
FIG. 4 is an audio frequency and sweep circuit wave diagram occurring in the input side of a comparator in the encoding circuit.

The time interval between the starting of the sweep and the firing point of the comparator is a function of the constant sweep slope applied to one grid in the comparator and the instantaneous value of the A.C. modulating wave applied to the second comparator grid. As indicated in FIG. 4, the comparator fires when the sweep voltage becomes equal to the constant plus an instantaneous value of the modulating wave. The constant is determined by the parameters of the circuit and the positive grid bias supplied by the bias circuit sources 30 and 31. The positive bias on the comparator 25 is fixed at a lower value than that on the comparator 26 so that the comparator 25 fires from the lower part and the comparator 26 on the upper part of the sweep. As a result radar pulse 4 always precedes radar pulse 5, see FIG. 3. During any sweep interval when no modulating voltage is present, or the modulating voltage is zero, the comparators fire at a point on the sweep determined by the fixed bias.

There is a fixed cycle relationship between each modulating wave and the sweep for each of the comparators. The pulse modulation cycle is equal to one cycle of the modulating wave and produces pulses 4 and 5 at varying intervals with relation to triggering radar pulse 3 and the sweep recurs within the cycle. The radar pulse 3 is in effect a reference pulse for the drone control or guidance pulses 4 and 5. As shown in FIG. 3 the leading edges of code pulses 4 and 5 vary in time spacing from the leading edge of the reference pulse 3. This variance is a function of the slowly varying D.C. potential applied to the grid in the second section of the comparators and the A.C. output of the comparators will have the same characteristic. This modulating D.C. voltage is the selected sum of the nine different modulating frequencies provided by the audio oscillators. Because nine different frequencies are provided, any combination thereof being available, as the modulating voltage for the comparator, hundreds of thousands of possible tone combinations can be supplied to the comparators. Pulse modulation of the radar pulses 4 and 5 thereby makes possible the information required to control the flight of the unmanned drone.

Dual triode blocking oscillator 38 is connected to the plate in the second section of the comparator 25 and delay network 62 is coupled through transformer 63 to the plate circuit of the oscillator. The output of blocking oscillator 38 on the grid in the second section thereof is fed to the common output line 14. Similarly, the dual triode blocking oscillator 40 is connected to the plate in the second section of the comparator 26 and delay network 65 is coupled through transformer 64 to the plate circuit of the oscillator. The output of the blocking oscillator 40 on the grid in the second section thereof is fed to the common output line 14.

Various modifications of the invention may be effected by persons skilled in the art without departing from the scope and principle of invention as defined in the appended claims.

What is claimed is:

1. A pulse encoder comprising a set of series connected pulse producers, a multiple frequency source, said source being connected to the input of one of said producers the latter being controlled thereby, delay networks disposed in the series connections of said producers, a second set of pulse producers connected in parallel lines and driven by the output of the first mentioned set of producers, means for pulse position modulating the pulses generated by said second set of pulse producers, said means being controlled by said source and another of said producers, a common output line, each of said pulse producers in the two sets of producers being individually connected to said common output line, and a pulser connected to said output line.

2. A pulse encoder comprising a set of series connected pulse producers, a multiple frequency source, said source being connected to the input of one of said producers the latter being controlled thereby, delay networks disposed in the series connections of said producers, a second set of pulse producers connected in parallel lines and driven by the output of the first mentioned set of producers, a sweep circuit connected to the output of the first set of pulse producers and disposed in partial control of said second set of pulse producers, audio oscillators driven by said source and also in partial control of said second set of pulse producers, switching and pulse triggering means connected between said audio oscillators and said second set of pulse producers, said pulse triggering means being controlled by said first-mentioned set of producers, a common output line, each of said pulse producers in the two sets of pulse producers being individually connected to said common output line, and a pulser connected to said output line.

3. A pulse encoder comprising a set of series connected pulse producers, a multiple frequency source, said source being connected to the input of one of said producers the latter being controlled thereby, delay networks disposed in the series connections of said producers, a second set of pulse producers connected in parallel lines and driven by the output of the first mentioned set of producers, a sweep circuit connected to the output of the first set of pulse producers and disposed in partial control of said second set of pulse producers, audio oscillators driven by said source and also in partial control of said second set of pulse producers, switching, summing and pulse triggering means connected between said audio oscillators and said second set of pulse producers, said pulse triggering means being controlled by said first-mentioned set of producers, a common output line, each of said pulse producers in the two sets of pulse producers being individually connected to said common output line, and a pulser connected to said output line.

4. A pulse encoder comprising a set of series connected pulse producers, a multiple frequency source, said source being connected to the input of one of said producers the latter being controlled thereby, delay networks disposed in the series connections of said producers, a second set of pulse producers connected in parallel lines and driven by the output of the first mentioned set of producers, a sweep circuit connected to the output of the first set of pulse producers and disposed in partial control of said second set of pulse producers, audio oscillators driven by said source and also in partial control of said second set of pulse producers, switching, summing and pulse triggering means connected between said audio oscillators and said second set of pulse producers, said pulse triggering means being biased at separate levels and controlled by said first-mentioned set of producers, each of said pulse producers in the two sets of pulse producers being individually connected to said common output line and an "or" gate connected between each oscillator and the common output line, and a pulser connected to said output line.

5. An encoder circuit comprising a set of blocking oscillators, means for triggering said oscillators, a delay network disposed between and connecting the oscillators in series, a sweep circuit receiving the output of said oscillators, comparators connected to the output of said sweep circuit, said comparators being biased on separate levels a plurality of audio oscillators driven by said triggering means to generate separately one of multiple frequencies, a group of switches for selectively connecting the output of said audio oscillators to each of said comparators, a second set of blocking oscillators connected in parallel lines each of said comparators being in control of a blocking oscillator in said second set of blocking oscillators, a common output line, each of said blocking oscillators being individually connected to said common output line, and a pulser connected to said output line.

6. An encoder circuit comprising a set of blocking oscillators, means for triggering said oscillators, a delay network disposed between and connecting the oscillators in series, a sweep circuit receiving the output of said oscillators, comparators connected to the output of said sweep circuit, a plurality of audio oscillators driven by said triggering means and adapted to generate separately one of multiple frequencies, a group of switches for selectively connecting the output of said audio oscillators to each of said comparators, a second set of blocking oscillators connected in parallel lines, each of said comparators being in control of a blocking oscillator in said second set, said comparators being biased at separate levels, a common output line, each of said blocking oscillators being individually connected to said common output line, an "or" gate connected between each blocking oscillator in said second set of oscillators and said common output line, and a pulser connected to said output line.

* * * * *